No. 633,992. Patented Oct. 3, 1899.
E. G. FULLERTON.
MILK COOLER.
(Application filed May 31, 1898.)
(No Model.)
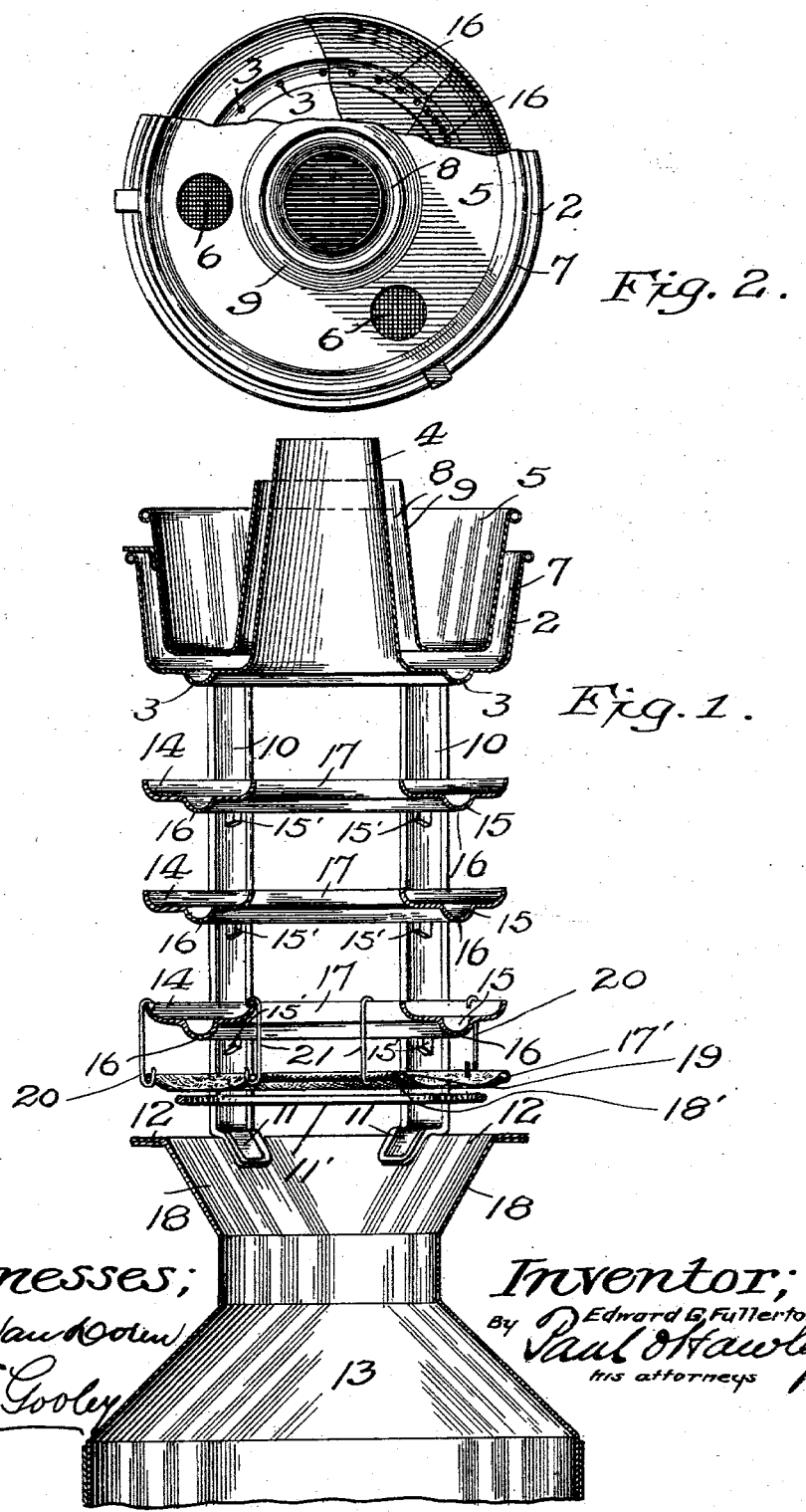

UNITED STATES PATENT OFFICE.

EDWARD GIBSON FULLERTON, OF MONTEVIDEO, MINNESOTA.

MILK-COOLER.

SPECIFICATION forming part of Letters Patent No. 633,992, dated October 3, 1899.

Application filed May 31, 1898. Serial No. 682,106. (No model.)

*To all whom it may concern:*

Be it known that I, EDWARD GIBSON FULLERTON, of the city of Montevideo, county of Chippewa, State of Minnesota, have invented certain new and useful Improvements in Milk-Coolers, of which the following is a specification.

This invention relates to simple means for cooling and aerating milk, to the end that the milk may be freed from heat before being placed in the cans from which it is delivered to customers or to the creamery.

The object of the invention is to provide a simple milk-cooler or aerator wherein the milk is cooled by falling through the air, to which it is freely exposed.

The particular object of the invention is to provide a milk-cooler that will be simple in construction, will be easy to keep clean, and that will be so cheap that it may be used by every farmer or dairyman.

My invention consists generally in a milk cooler and strainer of the construction and combination of parts hereinafter described, and particularly pointed out in the claims.

The invention will be more readily understood by reference to the accompanying drawings, forming part of this specification, in which—

Figure 1 is a vertical section of a milk-cooler embodying my invention. Fig. 2 is a plan view thereof with portions broken away to show the trays or shallow rings beneath the reservoir.

As shown in the drawings, 2 represents the receiving-reservoir, in the bottom of which are the series of holes 3, that are preferably arranged in the depressed ring or bead in the bottom of the reservoir. The reservoir is provided with the central tube 4 to allow the escape of heated air and the free circulation of air. Within the reservoir I preferably arrange the strainer-pan 5, having one or more small strainers 6 in its bottom. The pan is smaller than the reservoir 2, so that an air-space 7 is left between the two, and another air-space 8 is provided between the central tube 4 of the reservoir and the tube 9 of said pan 5. These air-spaces permit the escape of steam and heat from the milk that is poured into the reservoir. The reservoir 2 is supported upon legs 10, the lower ends of which are provided with feet 11, formed to fit the rim 12 of the milk-can 13, said legs being held firmly in position at their lower ends by the ring 11'. Beneath the reservoir, supported by brackets 15', arranged at intervals upon the legs 10, are one or more shallow pans, trays, or rings 14 14, each of which is preferably provided with a depressed bead 15 to insure the draining of the milk therefrom through the holes 16. These pans being supported upon the brackets 15', can be readily removed from their position and cleaned. Each ring is provided with a central opening 17 to allow free circulation of air. The milk drops or flows from the openings into the bottom of the reservoir and falls into the shallow tray or ring beneath, from which it drops in turn upon the next tray, and so on. The holes in the upper tray or ring 14 are larger than the holes 3 in the reservoir, and the holes in the second tray or ring are larger or more numerous than the holes in the first tray, and so on to the bottom, to prevent the flooding or overflow of the milk in the trays or rings.

In order to more thoroughly strain the milk before it passes into the can, I prefer to provide a strainer suspended, preferably, from the lower pan of the series and consisting of concentric rings 17' and 18', corresponding in diameter, respectively, to the diameter of the pans and of the central openings therein.

Between the rings 17' and 18' and supported thereby is a strainer 19, preferably of muslin cloth, through which the milk passes on its way to the can below. Any suitable means may be provided for supporting the strainer beneath the pan, such as hooks 20 and 21, having looped ends to pass over the edge of the pan and around the rings 17' and 18'. This construction permits the ready removal of the strainer at any time to permit it to be cleaned. All milk-cans are provided with the flaring tops 18, and the holes in the lower tray are so arranged that the milk will fall upon the inclined sides of the top of the milk-can, with the result that it will flow down the sides of the can instead of dropping directly into the can, the result being that the milk is still further exposed to the cooling effect of the air. The strainer 5 may be lifted out of the reservoir to facilitate the cleaning of both parts, and all parts of the device are easily kept clean. The appliance is light, so that it may be readily handled and placed upon different milk-cans. It is so simple and cheap in construction that it is easily within the reach of all farmers and dairymen, while its capacity is so great that it may be economically used upon the largest dairy-farms.

It is obvious that my milk-can may be supported in a stationary frame, and one milk-can after another may be placed beneath the same, thus saving some time in handling large quantities of milk.

Having thus described my invention, I claim as new and desire to secure by Letters Patent—

1. The combination, with a reservoir provided with openings in its bottom, of one or more shallow trays pans or rings arranged beneath the same to receive milk therefrom and from one another, each of said pans or trays having openings in its bottom, and a removable strainer comprising concentric rings 17' and 18', a strainer-cloth 19 and hooks 20 and 21 whereby the device is suspended from the pan above, substantially as described.

2. In a milk-cooler, the combination, with a reservoir having a central tube and provided with openings in its bottom, of one or more shallow trays, pans or rings 14 independently arranged beneath said reservoir to receive milk therefrom and from one another, each of said pans or trays having openings 16 in its bottom and a larger central opening 17, whereby when the central tube becomes heated a current of air will be maintained by a natural draft through the falling streams of milk between the pans up through the central openings therein and up through the central tube, and a strainer supported beneath the lower pan of the series, substantially as described.

3. A milk-cooler, comprising legs 10 having lower ends adapted to rest upon the top of the can, a reservoir supported upon said legs and provided with a central tube 4 and a series of holes 3, one or more pans or trays 14 supported one above another by said legs beneath said reservoir to receive milk therefrom and from one another, each pan being disconnected from the other pans and from said reservoir and independently removable, and each pan having a central opening 17 and a series of smaller openings or holes 16, whereby as the milk flows down through said holes 3 in the reservoir and from one pan to the next through said holes 16, a circulation of air will be established across the falling streams of milk between the pans up through the central openings in said pans and through said central tube 4, substantially as described.

4. In a milk-cooler, the combination, with legs or standards adapted to rest upon the top of the can, of a reservoir supported upon said legs and having a central tube and a series of holes in its bottom around the base of said tube, one or more pans or trays also supported by said legs one above another beneath said reservoir in position to receive milk therefrom and from one another, said pans being disconnected from one another and independently removable from their support, and each pan having a large central opening and a series of smaller openings surrounding the same, whereby as the warm milk is poured into the reservoir and the central tube becomes heated a circulation of air by natural draft will be established through the stream of milk as it falls from one pan to another up through the central openings in said pans and up through said central tube, substantially as described.

5. In a milk-cooler, the combination of a reservoir having a central tube and provided with outlet-openings in its bottom, with one or more shallow trays, pans or rings 14 arranged beneath said reservoir to receive milk therefrom and from one another, each of said pans or trays having openings 16 in its bottom and also having a large central opening 17 whereby when the central tube becomes heated a current of air will be maintained by natural draft upward through the falling streams of milk between the pans, through the central openings in said pans and through the tube of said reservoir, substantially as described.

In testimony whereof I have hereunto set my hand this 30th day of April, at Montevideo, Minnesota.

EDWARD GIBSON FULLERTON.

In presence of—
JOHN O. ANDERSON,
CHAS. H. BUDD.